United States Patent [19]

Medwed

[11] 4,167,092
[45] Sep. 11, 1979

[54] SEALING DEVICE FOR PACKAGING MACHINE

[75] Inventor: Emmerich Medwed, Wolfertschwenden, Fed. Rep. of Germany

[73] Assignee: Multivac Sepp Haggenmuller KG, Wolfertschwenden, Fed. Rep. of Germany

[21] Appl. No.: 902,028

[22] Filed: May 2, 1978

Related U.S. Application Data

[63] Continuation of Ser. No. 770,545, Feb. 22, 1977, abandoned.

[30] Foreign Application Priority Data

Mar. 3, 1976 [DE] Fed. Rep. of Germany ....... 2606434

[51] Int. Cl.$^2$ ............................................. B65B 51/14
[52] U.S. Cl. ..................................... 53/373; 53/511; 93/DIG. 1; 156/581
[58] Field of Search ............................ 53/112 A, 373; 93/DIG. 1; 156/581, 583

[56] References Cited

U.S. PATENT DOCUMENTS 2,125,758  8/1938  Waters .......................... 93/DIG. 1
3,102,182  8/1963  Oelze et al. ...................... 53/373 X
3,258,385  6/1966  Lake ................................. 156/581
3,659,393  5/1972  Richter ...................... 53/112 A X
3,992,850  11/1976  Vetter ...................... 53/112 A X

FOREIGN PATENT DOCUMENTS 626860  7/1949  United Kingdom ................. 156/581

Primary Examiner—Travis S. McGehee
Attorney, Agent, or Firm—Pollock, Vande Sande & Priddy

[57] ABSTRACT

A sealing device suitable for use in a vacuum packaging machine. The device is provided with a sealing tool and a resilient sealing backing cooperating with said sealing tool to seal two webs of heat-sealable packaging material therebetween when the sealing tool is moved towards the sealing backing. The sealing backing has a milled or knurled contacting surface structure comprising protrusions and/or depressions which may be pyramidal in shape, and the sealing tool has a substantially smooth or planar sealing surface. Adherence of the packaging material to the backing and to the sealing tool is avoided by cooperation of the protrusions and/or depressions with the smooth or planar surface of the sealing tool.

6 Claims, 4 Drawing Figures

SEALING DEVICE FOR PACKAGING MACHINE

This is a continuation of application Ser. No. 770,545 filed Feb. 22, 1977, now abandoned.

BACKGROUND OF THE INVENTION

The present invention relates to sealing devices and to packaging machines including same. A sealing means is known from, for example, German Pat. No. 2,323,409, issued to the present applicant, or from German Pat. No. 1,939,216 in which two tool portions are movable with respect to one another so as to close onto the work to be sealed. A sealing tool is disposed in one of the two portions and is adapted to be moved onto the work, and the other tool portion has an anvil surface against which the sealing tool pushes the work for sealing the same during the formation of the seal. The materials being sealed together are portions of thin materials, such as, for example, paper or foil webs, and the effect of the sealing is to enclose a container wholly or partly formed by the webs.

A sealing means of this kind may be used with packaging machines, especially vacuum packaging machines, such as are also known from the above mentioned printed publications. In such machines the anvil surface is formed of rubber and has a smooth surface. When the webs or foils are sealed, however, the problem arises that a plastic material web or foil contacting the anvil adheres thereto, to some extent, after the sealing operation. Such adhesion can be reduced by powdering the plastic material. However, with goods intended for medical use, such as, for example, syringes, powdering is impossible in view of the required degree of cleanliness. Furthermore, especially with respect to packaging objects of this kind, paper can be used as the cover of the container, and if adhesion of the plastic material to the anvil occurs, the freshly sealed joints between the paper and plastic materials are very easily torn.

Further representative art is disclosed in German Utility Model No. 1,802,886.

OBJECTS OF THE INVENTION

It is an object of the present invention to provide a sealing device in which adhesion of the material webs to the anvil and to the sealing tool is avoided.

It is a further object of the present invention to provide a sealing device suitable for use in a vacuum packaging machine.

It is a still further object of the present invention to provide a sealing device for a vacuum packaging machine in which a freshly sealed joint formed between a paper web and a plastic web will not be torn as a result of the adhesion of either of the paper or plastic webs to the sealing tool and/or sealing backing being prevented.

SUMMARY OF THE INVENTION

In order to achieve the above mentioned objects, the present invention provides sealing means for sealing together thin materials or webs of sealable material, the device comprising a sealing tool and a resilient sealing backing or anvil adapted to be pressed together from opposite sides of the webs so as to press and seal the webs together therebetween. Either the sealing tool or the anvil is provided with a milled or knurled contacting surface formed of protrusions and/or depressions which may be pyramidal in shape, while the other member has a substantially smooth or planar contacting surface.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 4:
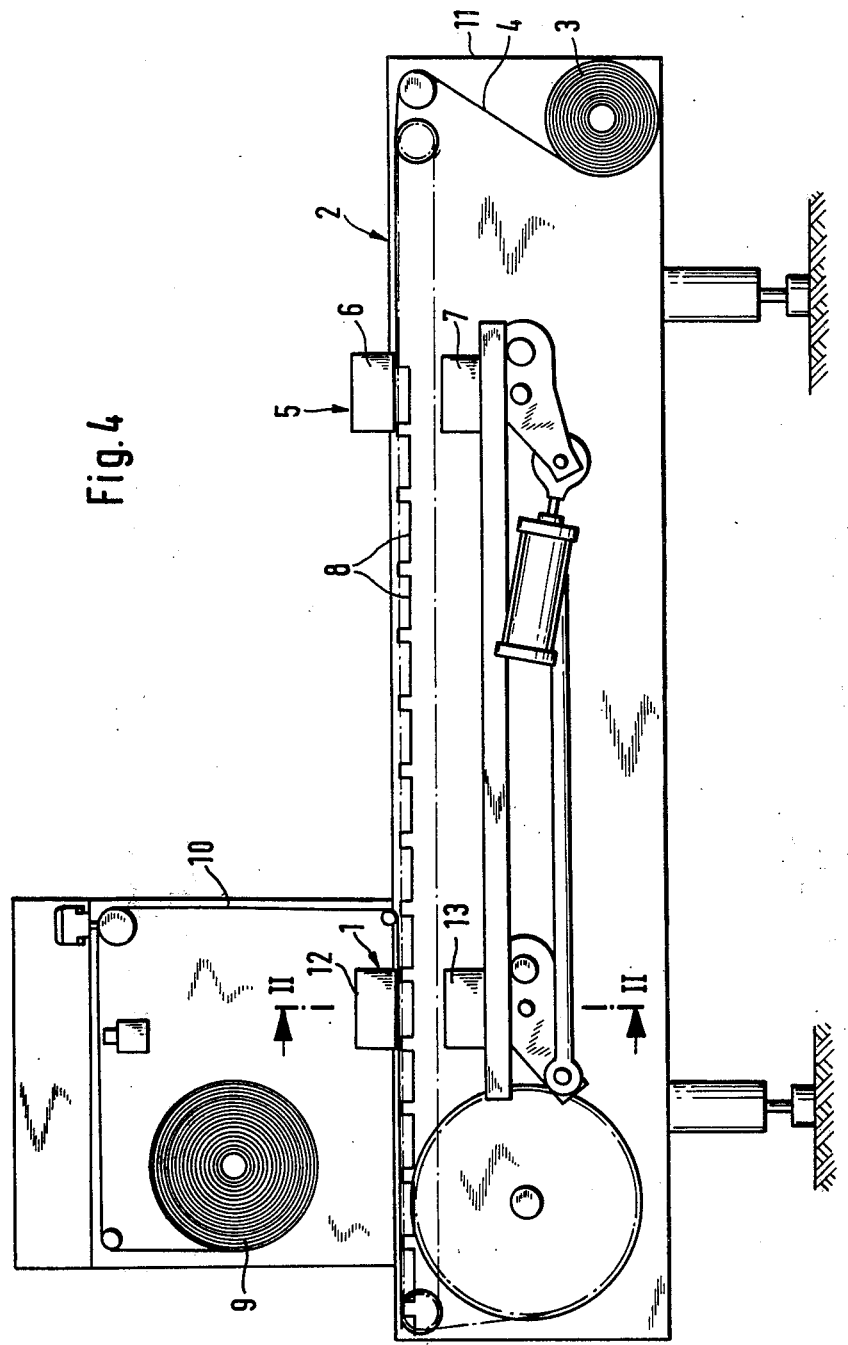
FIG. 4 is a packaging machine with the front wall thereof omitted.

Referring now to the drawings, and more particularly to FIG. 4 thereof, a sealing device embodying the present invention is to be used in a packaging machine such as that shown in FIG. 4. In the machine, a web 4, fabricated of a plastic foil material, is drawn from a material roller 3 and guided into a forming station comprising upper and lower portions 6,7. In this forming station, successive containers 8 are formed from the web by heating the same. The containers are then advanced to a filling station, which is not shown, and then to the sealing means generally indicated by the reference character 1. Where the packaging machine is a vacuum packaging machine, the sealing means comprises a vacuum station. At the same time that containers 8 are advanced to sealing means 1, a web 10, which may, for example, be fabricated of paper or a plastic material, is drawn from a material roller 9 and is likewise advanced to the sealing means 1. The web 10 is laid over the containers 8 in the sealing means and sealed thereto. After completion of the sealing operation, the containers are separated in a separating station, which is also not shown.

Figure 1:
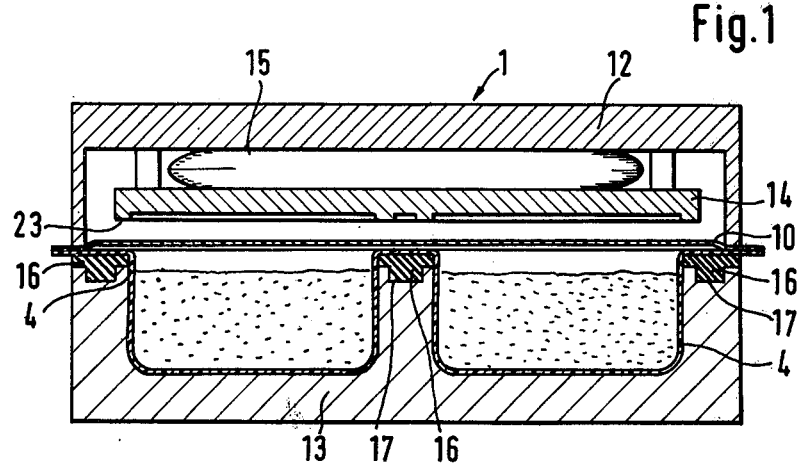
FIG. 1 is a cross-sectional view of an embodiment of a sealing means, employed within the machine of FIG. 4 and taken along the line II—II of FIG. 4, and showing the two portions of the sealing means moved apart.

The sealing means 1 is provided with a first, upper tool portion 12 mounted upon a machine frame 11, and a second, lower tool portion 13 adapted to be raised and lowered upon the frame. In the upper tool portion, there is provided a heatable sealing tool 14 which seals the webs 4 and 10 together. The sealing tool 14 is conventionally moved towards the lower tool by means of a pneumatic device 15 and is retracted to the position shown in FIG. 1 by means of biasing means, which are not shown.

Within each of the side walls of the lower tool portion 13 which define cavities within which the webs 4 are disposed there is provided a T-shaped anvil 16, fabricated of a resilient strip material. The strips 16 are disposed within longitudinal recesses 17 defined within the side walls, and during the sealing operation, portions of the web 4 are pushed against the anvils 16 by means of the pressure generated between the two portions 12 and 13, as well as the pressure developed between the anvils 16 and the sealing tool 14 through means of a peripheral sealing surface 23 of tool 14. The webs 4 and 10 are thereby pressed together whereby a seal is formed therebetween.

The surface 18 of anvil 16 which is presented to the web 4 has a roughened surface structure. As shown, this surface is formed by milling, with elevated linear transverse zones 19 and elevated linear longitudinal zones 20, and pyramidal depressions or recesses 21 formed therebetween having respective nadirs 22. In the example of the embodiment, the apex angle α of each pyramid is 90 degrees and the distance a defined between two successive parallel linear elevations is 0.8 mm. With this structure of the surface 18 of the anvil or sealing backing 16, the elevations 19 and 20 are deformed by means of the pressure of the sealing tool 14 into a substantially smooth surface due to the resiliency of anvil 16. After completion of the sealing operation, the elastic material 16 returns to its original position shown in FIGS. 2 and 3. We have found that such surface structure avoids adhesion between the web 4 and the anvil 16, or alternatively that any potential adhesion is immediately abviated upon the release of the pressure developed between the tool 14 and the anvil 16. In addition, we have also found it possible to produce packages, formed, for example, of a nonpowdered, line or coated lower foil web and of an upper paper web, without incurring any risk that the freshly formed joints would be torn as a result of any adherence between the lower foil and the sealing backing 16.

Figure 3:
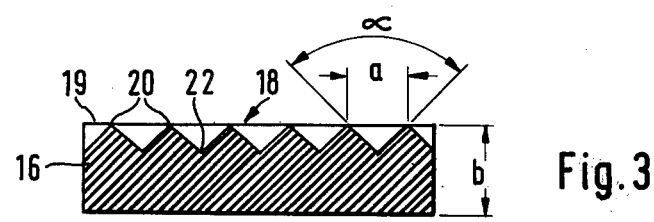
FIG. 3 is a cross-sectional view of the anvil of FIG. 2 taken along line III—III of FIG. 2.
Figure 2:
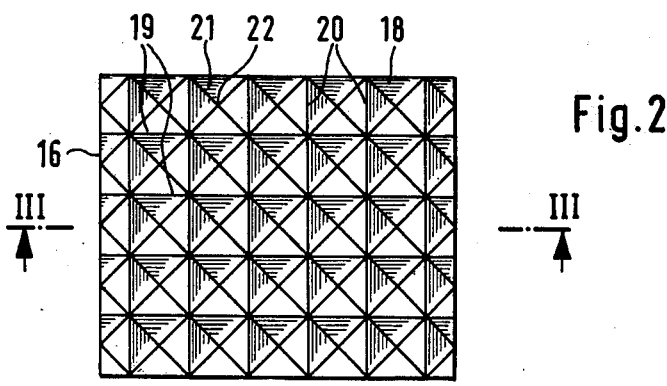
FIG. 2 is a plan view of the surface of the anvil.

Alternatively with respect to the milled structure shown in FIGS. 2 and 3, the linear longitudinal and transverse zones could be recessed and the pyramidal zones could be elevated. In this case, too, adhesion between the sealing backing 16 and the lower foil 4 is avoided. The structure shown in FIGS. 2 and 3 comprising the elevated longitudinal and transverse zones and recessed pyramidal portions, however, provides particular good rigidity, and furthermore, the surface thus formed recovers quite rapidly to its original state.

As a still further alternative with respect to the disclosed milled structure, it is also possible to provide the surface 18 of the anvil 16 as a knurled surface in which elongated elevated zones merely alternate with longitudinally recessed zones. With this embodiment, too, adhesion between the lower foil and the anvil is avoided. This surface, however, does not provide the same rigidity as the surface of the embodiment shown in FIGS. 2 and 3 comprising the longitudinally and transversely interconnected elevated zones.

Silicone rubber is particularly well adapted as a material for the anvil 16, and in the embodiment shown, the thickness b of the silicon rubber is approximately 2 mm. It is also to be noted that the roughened surface may be formed upon the sealing tool 14 or upon the anvil 16, or upon both.

Although the invention has been described with reference to preferred embodiments, it is to be understood that these embodiments are merely illustrative of the principles of the invention. Thus, it is to be understood further that numerous modifications may be made in the embodiments disclosed herein and other arrangements may be devised without departing from the spirit and scope of the invention.

What is claimed is:

1. A sealing device for sealing together two webs of packaging material, comprising:
    a sealing tool; and
    a sealing backing;
    said sealing tool and said sealing backing being arranged for relative reciprocating movement for sealing said webs therebetween;
    said sealing backing including a resilient contacting surface facing said sealing tool;
    said sealing tool including a sealing surface facing said contacting surface of said sealing backing; and
    said contacting surface being formed of protrusions or depressions, and said sealing surface having a substantially smooth structure;
    whereby as a result of the operative cooperation developed between said protrusions or depressions and said substantially smooth structure, adherence of said packaging material to said contacting surface is avoided.

2. The sealing device of claim 1 in which said resilient contacting surface has formed therein a multiplicity of substantially uniformly spaced discrete depressions and intervening upstanding portions.

3. The sealing device of claim 1 wherein said resilient contacting surface is provided with elevated longitudinally extending portions and pyramidal depressions.

4. The sealing device of claim 1 wherein said resilient contacting surface is provided with indented longitudinally extending portions and pyramidal upstanding portions.

5. The sealing device of claim 1 wherein said resilient contacting surface is provided with indented first and second longitudinally extending portions lying respectively transverse to each other and is further provided with pyramidal upstanding portions.

6. A sealing device for sealing together two webs of packaging material comprising:
    a heatable sealing tool;
    a sealing backing element;
    means for reciprocally moving at least one of said sealing tool and said backing element for sealing said webs therebetween;
    said backing element including a resilient contacting surface facing said sealing tool;
    said sealing tool including a smooth planar sealing surface facing said resilient contacting surface of said backing element;
    said resilient contacting surface provided with first and second elevated longitudinally extending portions lying respectively transverse to each other and further provided with pyramidal depressions, the resilience of said contacting surface and the sizes of said elevated longitudinally extending portions and said depressions cooperating to provide a substantially smooth surface on said backing element when said backing element and said sealing tool are urged together under pressure with said webs therebetween for a sealing operation, whereby upon the release of pressure between said backing element and said sealing tool said upstanding portions are restored to their normal protruding position to ensure disengagement of said packaging material from said backing element.

* * * * *

UNITED STATES PATENT AND TRADEMARK OFFICE
CERTIFICATE OF CORRECTION

PATENT NO.   :   4,167,092
DATED        :   September 11, 1979
INVENTOR(S)  :   Emmerich Medwed It is certified that error appears in the above-identified patent and that said Letters Patent is hereby corrected as shown below:

Delete the printed claim 1 and substitute the following claim:

1. A sealing device for sealing together two webs of packaging material comprising:

a heatable sealing tool;

a sealing backing element;

means for reciprocally moving at least one of said sealing tool and said backing element for sealing said webs therebetween;

said backing element including a resilient contacting surface facing said sealing tool;

said sealing tool including a smooth planar sealing surface facing said resilient contacting surface of said backing element;

said resilient contacting surface comprising a multiplicity of upstanding portions and depressions, the resilience of said contacting surface and the sizes of said upstanding portions and said depressions cooperating to provide

UNITED STATES PATENT AND TRADEMARK OFFICE
CERTIFICATE OF CORRECTION

PATENT NO. : 4,167,092
DATED : September 11, 1979
INVENTOR(S) : Emmerich Medwed

It is certified that error appears in the above-identified patent and that said Letters Patent is hereby corrected as shown below:

a substantially smooth surface on said backing element when said backing element and said sealing tool are urged together under pressure with said webs therebetween for a sealing operation, whereby upon the release of pressure between said backing element and said sealing tool said upstanding portions are restored to their normal protruding position to ensure disengagement of said packaging material from said backing element.

Signed and Sealed this

Thirty-first Day of July 1984

[SEAL]

Attest:

*Attesting Officer*

GERALD J. MOSSINGHOFF
*Commissioner of Patents and Trademarks*